Patented Apr. 24, 1951

2,550,211

UNITED STATES PATENT OFFICE 2,550,211

AQUEOUS EMULSION AND A PROCESS OF MAKING IT

Andrew J. Watters, West Kilbride, and David M. Shepherd, Stevenston, Scotland, assignors to Imperial Chemical Industries Limited, a corporation of Great Britain No Drawing. Application January 12, 1948, Serial No. 1,906. In Great Britain January 17, 1947

7 Claims. (Cl. 252—311)

The present invention relates to improvements in the production of aqueous emulsions of the kind wherein the aqueous phase constitutes the dispersion medium and the disperse phase comprises a water insoluble aliphatic substance of long chain molecular structure, if desired or necessary in solution in a water insoluble organic solvent. The disperse phase may accordingly comprise an oil of long chain aliphatic hydrocarbon or ester structure or a fat, or a wax of said structure, dissolved in a water insoluble organic solvent. The invention is, however, also applicable to the production of dispersions resulting from the cooling and storage of emulsions made in accordance with the invention at raised temperatures with molten fats and waxes of suitably low melting characteristics e. g. tallow lard or margarine fats, in which dispersions the disperse phase is in more or less completely solid state.

The water soluble methyl ethers of cellulosic compounds e. g. water-soluble methyl cellulose, methyl ethyl celluloses and methyl hydroxy-ethyl celluloses are soluble in cold water and are precipitated from solution in water at more or less raised temperatures, but it is known that in aqueous solution they are excellent emulsifying agents for oils and fats and have found employment for this purpose. Their stable nature, freedom from colour and odour, and non-toxic properties render them especially desirable for use in the production of emulsions for medicinal and alimentary purposes. Owing to the manner of their manufacture the water soluble methyl ethers of cellulosic compounds are in general of fairly low viscosity characteristics, and in order to avoid the introduction of substantial frothing it is usually desirable to employ aqueous solutions of not less than about 5% concentration of the methyl ether of the cellulosic compound. The water-soluble alkali metal salts of carboxy methyl cellulose are also odourless non-toxic substances and are soluble in water up to the boiling point. They are however poor emulsifying agents for substances of aliphatic long chain molecular structure, and the fact that they are salts of organic acids to some extent renders their solutions liable to change in properties with pH.

We have made the remarkable discovery that in conjunction with a minor proportion of a water-soluble methyl ether of a cellulosic compound in aqueous solution in a concentration insufficient of itself to give effective emulsification of a water insoluble aliphatic substance of long chain aliphatic structure, the use of a major proportion of a water-soluble alkali metal salt of carboxy-methyl cellulose having substantially higher viscosity characteristics than said methyl ether confers on the aqueous solution an emulsifying efficiency approaching or even exceeding that of a solution of the methyl ether of the same total cellulose ether concentration, and enables the emulsion to be made without any substantial frothing.

According to the present invention, therefore, the process for the production of aqueous emulsions of the kind wherein the aqueous phase constitutes the dispersion medium and the disperse phase comprises a water-insoluble aliphatic substance of long chain molecular structure comprises employing as the emulsifying agent a minor proportion of a water-soluble methyl ether of a cellulosic compound in a concentration insufficient of itself to give effective emulsification of the said water-insoluble aliphatic substance and a major proportion of a water-soluble alkali metal salt of carboxy-methyl cellulose having substantially higher viscosity characteristics than said methyl ether.

Thus if there is used a methyl ethyl cellulose whose viscosity in 1% solution in water at 20° C. is about 10 centipoises, the viscosity of the water soluble sodium salt of carboxymethyl cellulose in 1% solution at 20° C. may advantageously be about 50 to 100 or more centipoises. The proportion by weight of alkali metal salt of carboxy-methyl cellulose to the methyl ether of the cellulosic compound may advantageously be about 3 to 1. The actual concentrations of the two cellulose ethers employed to make the emulsion may vary somewhat, but usually it will be possible to employ solutions having a total cellulose ether content below 5%. Moreover, it is often possible to form the emulsion without the use of any special homogenisation apparatus, e. g. by simple high speed stirring. According to the invention, it is often possible to obtain emulsions less liable to creaming than when the emulsion is made with a methyl ether of a cellulosic compound alone, at the same total cellulose ether concentration.

By the term "water-soluble methyl ether of a cellulosic compound" is included a water-soluble methyl ethyl ether of cellulose, a water-soluble methyl ether of cellulose, and a water-soluble methyl hydroxy ethyl ether of cellulose.

Preferably the water-soluble methyl ether of a cellulosic compound is a water-soluble methyl ethyl cellulose containing between 0.3 and 0.5 methyl groups and between 0.8 and 1.0 ethyl groups per glucose unit of cellulose and having a viscosity approximately 10 centipoises in 1% solution in water at 20° C.

Preferably the water-soluble alkali metal salt of carboxy-methyl cellulose is a water-soluble sodium salt of carboxy-methyl cellulose having between 0.3 and 0.8 sodium carboxy-methyl groups per glucose unit of cellulose and a viscosity of about 75 centipoises in a 1% solution in water at 20° C.

*Example I*

The cellulose ethers used are a water-soluble methyl ethyl cellulose containing 0.4 methyl groups and 0.9 ethyl groups per glucose unit of cellulose, having a viscosity of approximately 10 centipoises in 1% solution in water at 20° C., and a water soluble sodium salt of carboxy-methyl cellulose having 0.45 sodium carboxy-methyl groups per glucose unit of cellulose, and a viscosity of about 75 centipoises in a 1% solution in water at 20° C. The substance emulsified is cod liver oil. In forming the emulsion the aqueous phase contains 0.75% of the above methyl ethyl cellulose, and 2.25% of the above sodium salt of carboxy-methyl cellulose and 97% water. The proportion of cod liver oil to water is 1:3, and the emulsion is made by high speed stirring. It forms easily and there is practically no frothing. After 28 days storage there is no change in the appearance of the emulsion. The emulsion made in similar fashion using a 3% solution of the methyl ethyl cellulose containing none of the sodium salt of the carboxy-methyl cellulose foams heavily while it is being made, and there is marked creaming after 28 days storage. An emulsion made with a 3% solution of the sodium salt of the carboxy-methyl cellulose alone breaks in less than one day.

*Example II*

The cellulose ethers are the same as those used in Example I, and they are used in the same proportions and concentration in the aqueous phase. The substance emulsified is cotton seed oil, and the proportion of oil to water is 1:5 by weight. An excellent emulsion is obtained without frothing and no creaming occurs after 28 days storage. An emulsion similarly formed using a 3% solution of the methyl ethyl cellulose creams somewhat after 28 days storage and its formation is attended by much frothing. It is not possible to maintain an emulsion of cotton seed oil using a 3% solution of the sodium salt of carboxy methyl cellulose alone for more than a few days.

*Example III*

The cellulose ethers are the same as those used in Example I, and they are used in the same proportions and concentration in the aqueous phase. The substance emulsified is a mineral oil of long chain liquid aliphatic hydrocarbon character and the proportion of the water to the aqueous phase is 1:1 by weight. An excellent emulsion which does not cream after 28 days storage is obtained without frothing on high speed stirring. An excellent emulsion is also obtained when the proportion of oil to water is increased to 3:2. When there is used a 3% solution of the methyl ethyl cellulose alone, frothing is encountered during the formation of the emulsions, and the emulsion in which the proportion of oil to water is 1:1 creams somewhat after 28 days storage.

*Example IV*

The cellulose ethers are the same as in Example I and are used in the same proportions and amounts in the aqueous phase. The substance emulsified is tallow. The tallow is melted by heating to 40° C. and mixed with three times its weight of an aqueous solution containing the two cellulose ethers, heated to the same temperature, with high speed stirring. At this temperature the methyl ethyl cellulose remains in solution, and the stirring is continued at falling temperature until the dispersed tallow particles have become solid again. The resulting dispersion is then passed through a homogeniser.

The emulsification of the molten tallow takes place without appreciable frothing and when cold the dispersion remains stable for at least 28 days. A 3% solution of the methyl ethyl cellulose alone also gives a stable dispersion of the tallow when employed in similar fashion, but the formation of the emulsion is attended by considerable frothing. A 3% solution of the sodium salt of carboxy-methyl cellulose alone fails to disperse the tallow.

*Example V*

The same procedure is adopted as in Example I except that the water-soluble methyl ethyl cellulose is replaced by the same quantity of a water-soluble methyl glycol cellulose containing 1.5 methyl groups and .25 hydroxy ethyl groups per glucose unit of cellulose.

*Example VI*

The same procedure is adopted as in Example II except that the water-soluble methyl ethyl cellulose is replaced by the same quantity of a water-soluble methyl cellulose containing 1.5 methyl groups per glucose unit of cellulose.

We claim:

1. An aqueous emulsion wherein the aqueous phase constitutes the dispersion medium and the dispersed phase is comprised of a water-insoluble long chain aliphatic substance selected from the group consisting of oils, fats and waxes, the emulsion containing a minor proportion of a water-soluble methyl ether of cellulose in a concentration insufficient by itself to give effective emulsification of said water-insoluble substance and a major proportion of a water-soluble alkali metal salt of carboxy-methyl cellulose having substantially higher viscosity characteristics than said methyl ether.

2. An aqueous emulsion as claimed in claim 1 wherein the proportion by weight of the alkali metal salt of carboxy-methyl cellulose to the methyl ether of cellulose is 3 to 1.

3. An aqueous emulsion as claimed in claim 1 wherein the total concentration of the two cellulosic ethers in the aqueous solutions employed to make the emulsions is below 5%.

4. An aqueous emulsion as claimed in claim 1 wherein the water-soluble methyl ether of cellulose is a water-soluble methyl ethyl cellulose containing between 0.3 and 0.5 methyl groups and between 0.8 and 1.0 ethyl groups per glucose unit of cellulose and having a viscosity of approximately 10 centipoises in a 1% solution in water at 20° C.

5. An aqueous emulsion as claimed in claim 1 wherein the water-soluble alkali metal salt of carboxy-methyl cellulose is a water-soluble sodium salt of carboxy-methyl cellulose having between 0.3 and 0.8 sodium carboxy-methyl groups per glucose unit of cellulose and a viscosity of about 75 centipoises in a 1% solution in water at 20° C.

6. A process for the production of aqueous emulsions of the kind wherein the aqueous phase constitutes the dispersion medium and the disperse phase comprises a water-insoluble long chain aliphatic substance selected from the group consisting of oils, fats and waxes, which comprises emulsifying said water-insoluble substance in an aqueous solution containing a minor proportion of a water-soluble methyl ether of cellulose in a concentration insufficient by itself to give effective emulsification of said water-insoluble substance and a major proportion of a water-soluble alkali metal salt of carboxy-methyl cellulose having substantially higher viscosity characteristics than said methyl ether.

7. A process as claimed in claim 6 wherein the emulsion is formed by high speed stirring.

ANDREW J. WATTERS.
DAVID M. SHEPHERD.

REFERENCES CITED

The following references are of record in the file of this patent:

UNITED STATES PATENTS

| Number | Name | Date |
|---|---|---|
| 1,970,572 | Murray | Aug. 21, 1934 |
| 2,111,402 | Muller | Mar. 15, 1938 |
| 2,245,499 | Reichel et al. | June 10, 1941 |
| 2,340,072 | Medl | Jan. 25, 1944 |
| 2,372,756 | Auer | Apr. 3, 1945 |

FOREIGN PATENTS

| Number | Country | Date |
|---|---|---|
| 328,934 | Great Britain | Apr. 25, 1930 |
| 330,897 | Great Britain | June 16, 1930 |
| 351,444 | Great Britain | June 19, 1931 |

OTHER REFERENCES

Heaton: "Outlines of Paint Technology," 3rd edition (1947), page 392.